(12) United States Patent
O'Neill

(10) Patent No.: US 6,834,621 B1
(45) Date of Patent: Dec. 28, 2004

(54) ANIMAL RESTRAINT SYSTEM AND UNIVERSAL SEAT BUCKLE

(76) Inventor: Michael C. O'Neill, 2034 Winsburg Dr., Kennesaw, GA (US) 30144

( * ) Notice: Subject to any disclaimer, the term of this patent is extended or adjusted under 35 U.S.C. 154(b) by 10 days.

(21) Appl. No.: 10/277,443

(22) Filed: Oct. 22, 2002

(51) Int. Cl.[7] .......................... B60R 22/00; B60R 22/26
(52) U.S. Cl. ....................................... 119/771; 119/770
(58) Field of Search ................................ 119/770, 771, 119/769, 772, 795; 24/579.09, 579.11; 297/464, 468, 483

(56) References Cited

U.S. PATENT DOCUMENTS

| | | | |
|---|---|---|---|
| 2,539,606 A | 1/1951 | Bailey | 118/143 |
| 2,695,052 A | 11/1954 | Yates, et al. | 155/189 |
| 2,909,154 A | 10/1959 | Thomas | 119/711 |
| 3,169,036 A | 2/1965 | Spooner | 297/256 |
| 3,301,594 A | 1/1967 | Pukish, Jr. | 298/389 |
| 3,310,034 A | 3/1967 | Dishart | 119/711 |
| 4,324,204 A | 4/1982 | Friedman | 119/711 |
| 4,394,050 A | 7/1983 | Spooner | 297/468 |
| 4,817,562 A * | 4/1989 | Giroux | 119/771 |
| 4,941,434 A * | 7/1990 | Ellwanger | 119/771 |
| 5,131,682 A | 7/1992 | Reed | 280/801 |
| 5,154,660 A | 10/1992 | Snyder et al. | 119/711 |
| 5,517,949 A * | 5/1996 | Harris et al. | 119/795 |
| 5,624,135 A * | 4/1997 | Symonds | 297/468 |
| 5,806,467 A * | 9/1998 | Arakawa | 119/771 |
| 5,813,367 A * | 9/1998 | O'Brien | 119/770 |
| 5,915,335 A * | 6/1999 | Holt, Jr. | 119/771 |

* cited by examiner

Primary Examiner—Charles T. Jordan
Assistant Examiner—Elizabeth Shaw
(74) Attorney, Agent, or Firm—Myers & Kaplan, LLC; Ashish D. Patel

(57) ABSTRACT

A restraint system for pets is disclosed having a leash portion with a buckle at one end for securing to an automotive seat belt and a clasp at the other end for securing to a collar or harness. The buckle sized to cooperate with a variety of different seat belt keepers. The restraint system having a loop spaced from the clasp to allow a user to walk the pet.

36 Claims, 12 Drawing Sheets

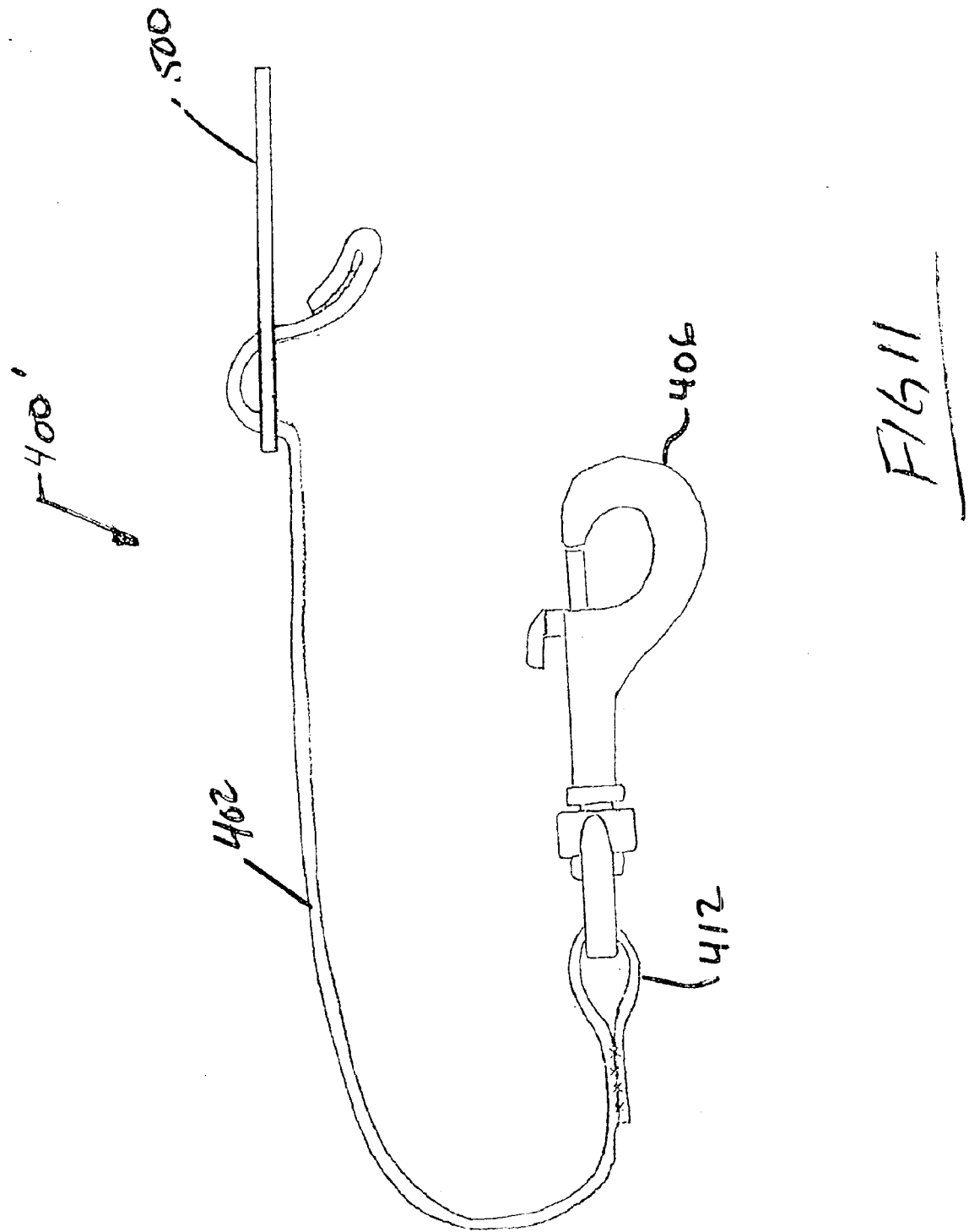

ANIMAL RESTRAINT SYSTEM AND UNIVERSAL SEAT BUCKLE

CROSS-REFERENCE TO RELATED APPLICATION

This application claims the benefit of co-pending U.S. provisional patent application Ser. No. 60/336,091 filed Oct. 23, 2001 entitled "Animal Restraint for a Vehicle" and U.S. provisional patent application Ser. No. 60/340,115 filed Nov. 2, 2001 entitled "Improved Restraint Buckle for use in Multiple Vehicles", the teachings of which are incorporated herein by reference. Applicant wishes to make reference to Disclosure Document No. 499,364 entitled "Animal (Dog/Cat) Restraint for Automobiles" dated Sep. 4, 2001 and requests the Disclosure Document be retained beyond the two-year time period.

FIELD OF THE INVENTION

The present invention relates to automotive restraint systems and more particularly to a pet leash with a buckle for securing to a variety of automotive seat belt keepers.

BACKGROUND OF THE INVENTION

In transporting animals or pets such as dogs and cats, it is necessary to safely restrain the animal while the vehicle is in motion to prevent harm that may occur upon a sudden stop or accident. It is also desirable to give the animal a certain degree of freedom in moving about the vehicle. The degree of freedom, however, must be limited animal cannot exit the vehicle through a window or other opening while the vehicle is in motion. It is also desirable to prevent the animal from escaping when the vehicle door is opened by the user. While various harnesses have been developed for restraining animals in a vehicle, they either restrain the animal too closely to the vehicle seat with a very limited degree of freedom, or require elaborate fastening systems for fixing the harness to the vehicle.

A tethering arrangement for animals is shown in U.S. Pat. No. 2,909,154. This arrangement requires a base strap that is slipped over the back of an automobile seat. The base strap supports a ring shaped attaching member that is connected to a tethering strap. The tethering strap includes a short leash that is fixed to the ring shaped attaching member on the base strap. Snap hooks are included at both ends of the tethering strap for attaching to the ring shaped attaching member and a dog collar.

U.S. Pat. No. 3,310,034 discloses a pair of elongated flexible straps for fastening a harness to a pair of eyebolts anchored in the back seat of an automobile. A loop formed at one end of the harness secures the harness to the eyebolt. The other end of the strap is provided with the keeper member of a locking mechanism while the dog harness is provided with a hooked plate adapted to interlock with the keeper member. The straps also pass loosely through rings in the harness.

These arrangements require straps to be fixed to either the vehicle body or the vehicle seat. These assemblies include a retrofit portion for fixing to the vehicle as well as a separate portion for securing to the animal. A problem exists with these arrangements in that it may be difficult to install the elaborate fastening systems required to be fixed or retrofitted to the vehicle.

In the United States, there are over thirty makes of passenger vehicles available to consumers. Among these makes of passenger vehicles, each offers several models. Each of these vehicles are required to contain a passenger restraint system currently consisting of a seat belt having a buckle on one end which is securable to a keeper which is connected to the vehicle usually at a location on the floor. The buckle is designed to latch into the keeper. The keeper typically contains a release mechanism consisting of a button that may be depressed by the passenger to separate the buckle from the keeper. Since each keeper is uniquely mateable with the buckles within a vehicle and in particular a certain buckle within the vehicle, the keeper and the buckle may be a unique mateable set having dimensions for being only mated with a keeper for a particular make and model.

In some situations, it is desirable to utilize the keeper within a vehicle for connection to a device other than the passenger restraint device (seat belt). For example, a buckle may be attached to a tether which in turn is attached to an animal, a package, or any other object in order to secure the animal, package or object within the vehicle. In these situations, a problem exists in that a separate unique buckle must be designed and attached to such a tether in order to fit each make and model. Since there are at least thirty makes, each having multiple models currently available, manufacturing and stocking unique buckles for each make and model becomes difficult and expensive.

SUMMARY OF THE INVENTION

It is therefore desirable to provide an animal restraint system that safely restrains the animal to an existing seat belt keeper.

In accordance with one aspect of the invention, a novel animal restraint system for securing an animal in a vehicle is provided having a length of tether with a first end with a clasp for connecting to a pet collar or harness and a second end with a first releasably connector. The first releasably connector coupleable to a mating connector, the mating connector being part of a length adjustor. The length adjustor having an opening through which a portion of tether is inserted. The tether coupled to the length adjustor and the first connector to form a loop upon which a buckle may be carried, the buckle coupleable to an automotive seat belt keeper.

In accordance with another aspect of the invention, a novel animal restraint system for securing an animal in a vehicle is provided having a length of tether having a first end and a second end with a clasp for connecting to a pet collar or harness being coupled about the first end. The system further having a length adjustor with a first opening through which a portion of the tether is inserted. The length adjustor coupled to the second end of the tether to form a loop for carrying a buckle, the buckle coupleable to an automotive seat belt keeper.

In accordance with another aspect of the invention, a novel animal restraint system for securing an animal in a vehicle is provided having a length of tether with a clasp at a first end for connecting to a pet collar or harness. The system further having a buckle with a tongue section for coupling to an automotive seat belt keeper and a length adjustor with an opening through which a portion of the tether is inserted, the length adjustor forming a second loop for restraining the buckle.

In accordance with another aspect of the invention, a buckle mateable with a plurality of vehicle restraint system keepers is provided having a tether restraint section and a tongue section extending from the tether restraint section, the tongue section having a slot formed therein. The tongue having an overall width of less than approximately 0.8", a thickness of less than approximately 0.13" and a front wall portion having a width of less than approximately 0.23"; the slot having an overall width of greater than approximately 0.52" and a length of greater than approximately 0.99".

In accordance with another aspect of the invention, a buckle is provided having a tongue section and a tether retaining section coupled to the tongue section. The tether retaining section having generally parallel first and second openings through which a tether may be inserted. The tongue section having a slot formed therein, the tongue section having a thickness of less than 0.13", an overall width of less than approximately 0.8", and a front wall portion having a width of less than approximately 0.23", the slot having an overall width of greater than approximately 0.53" and a length of greater than approximately 0.99"

In accordance with another aspect of the invention, a buckle is provided having a tongue section and a tether retaining section coupled to the tongue section. The tether retaining section having generally parallel first and second openings through which a tether may be inserted, the longitudinal axis of the openings being oriented at an angle other than generally perpendicular to the longitudinal axis of the buckle.

In accordance with another aspect of the invention, a novel animal restraint system for securing an animal in a vehicle is provided having a length of tether with a clasp for connecting to a pet collar or harness coupled about a first end and a buckle having a tongue section and a tether restraint section, the tongue section for coupling to an automotive seat belt keeper. The tether retaining section having generally parallel first and second openings through which a tether may be inserted.

In accordance with another aspect of the invention, a method of converting a pet leash with a clasp at a first end and a loop at a second end into a pet restraint system is disclosed. The method comprising the steps of providing a buckle having a tether restraint section with generally parallel first and second openings and a tongue section coupled to the tether restraining section and then threading a selected one of the first end and the second end of the pet leash serially through the first and second openings.

The above and other objects, feature, and advantages of the present invention will be apparent in the following detailed description thereof when read in conjunction with the appended drawings wherein the same reference numerals denote the same or similar parts throughout the several views.

BRIEF DESCRIPTION OF THE DRAWINGS

FIG. 11 is a perspective view of a sixth exemplary animal restraint system consistent with the present invention;

DETAILED DESCRIPTION OF THE PREFERRED EMBODIMENTS

Figure 1:
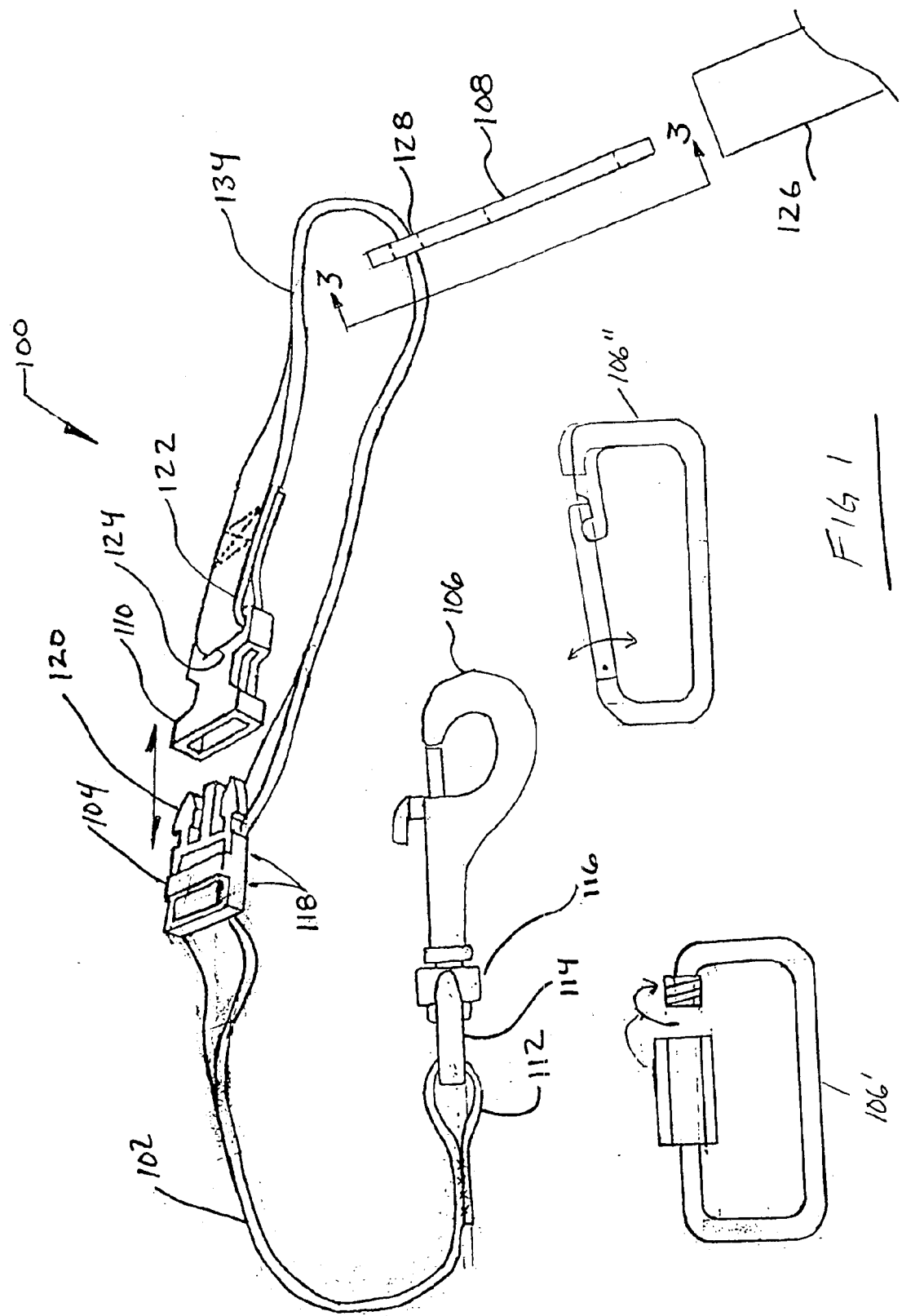
FIG. 1 is a perspective view of a first exemplary animal restraint system consistent with the present invention.

FIG. 1 shows an animal restraint system 100 having a length of tether 102, a length adjustor 104, a clasp 106, a buckle 108 and a first connector 110. The tether material may be made of cotton, polyester, polypropylene, leather or other suitable flexible materials. The dimensions of the tether may be adjusted to accommodate larger or smaller animals.

The clasp 106 is preferably a snap hook and may be coupled to a first end of the tether 102 by a loop 112. The loop 112 may be formed by inserting the tether 102 through an opening 114 in the clasp and then folding the tether back upon itself and either stitching the two pieces of tether material together or coupling them together using a mechanical fastener or adhesive. Alternatively, the tether may be mechanical or adhesively coupled to the clasp 106 without a loop. The clasp 106 may also include a swivel portion 116 that allows the clasp to rotate relative to the tether. Clasps include, but are not limited to snap hooks, quick links, screwgate and snapgate carabiner 106' and 106''', and mateable quick release buckles.

The length adjustor 104 may have an opening/s 118 through which the tether 102 may be inserted and a second connector 120. The length adjustor 104 may be moved along the tether 102 to change the overall length of the system from the clasp 106 to the buckle 108. The second connector 120 may be a mateable quick release buckle.

The first connector 110 may be coupled to a second end of the tether 102 by a loop 122. The loop 122 may be formed by inserting the tether 102 through an opening 124 in the connector and then folding the tether back upon itself and either stitching the two pieces of tether material together or coupling them together using a mechanical fastener or adhesive. Alternatively, the tether may be mechanical or adhesively coupled to the connector 110 without a loop. The first connector 110 may be releaseably coupleable to the second connector 120 to allow a pet owner to secure the system 100 to a structure, such as a tree or fence. A loop 134 may be formed between the length adjustor 104 and the first connector 110 when the first and second connectors are coupled together. The loop 134 may provide a convenient grasping location, spaced from the clasp 106, to allow a user to restrain his pet when the buckle 128 is separated from the keeper 126.

The buckle 108 is preferably sized to fit in a variety of seat belt keepers 126. The buckle has an opening 128 through which the tether 102 may be inserted. The buckle 108 may be carried by the loop 134. The keeper 126 (see FIG. 3) may be coupled to the vehicle by a tether 132. The keeper may have a release mechanism 130 to separate the buckle 108 from the keeper 126.

Figure 2:
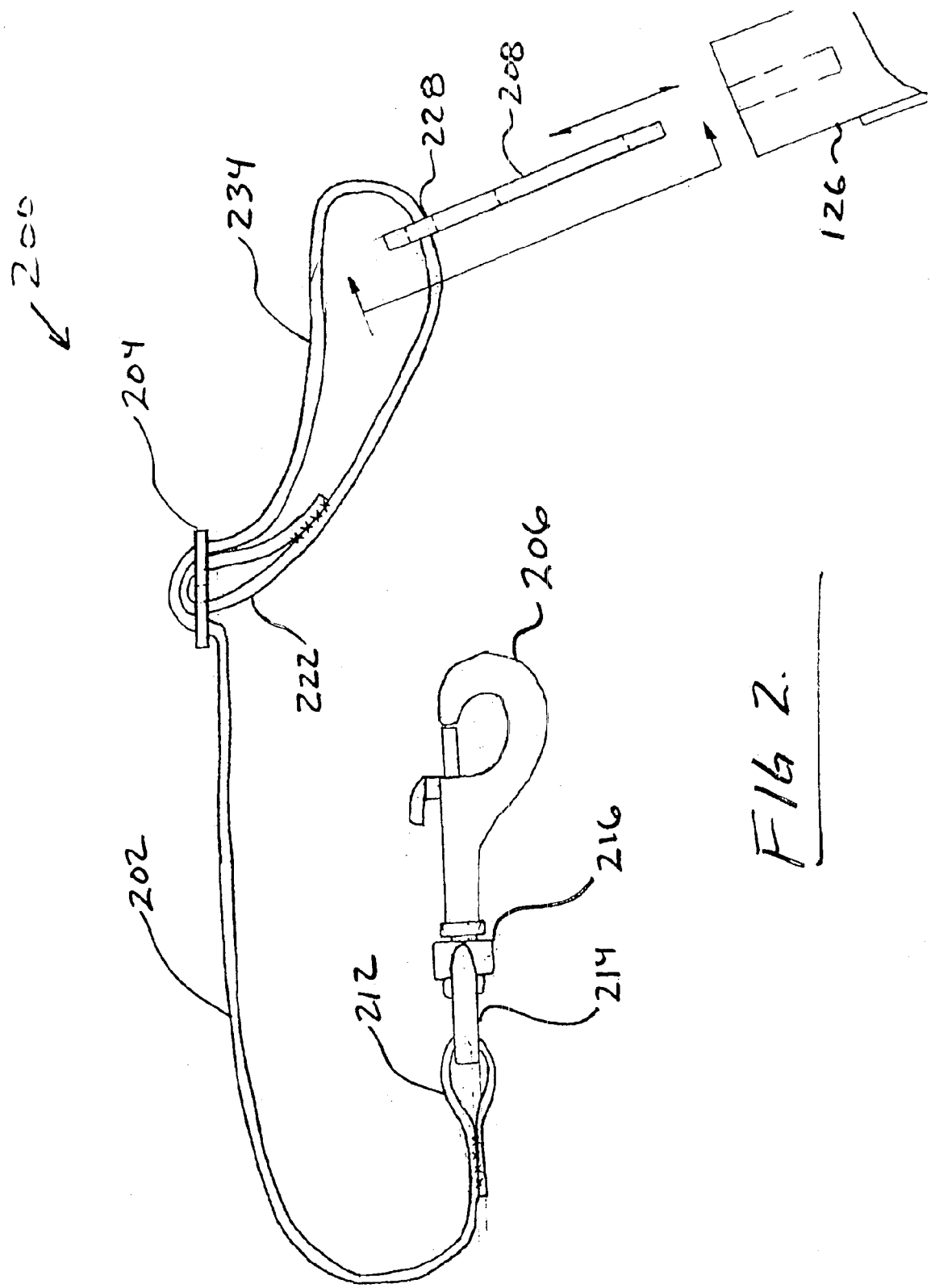
FIG. 2 is a perspective view of a second exemplary animal restraint system consistent with the present invention.

FIG. 2 shows an animal restraint system 200 having a length of tether 202, a length adjustor 204, a clasp 206, and a buckle 208. The tether 202, the clasp 206 and the buckle 208 may be identical to those shown in FIG. 1.

Figure 6:
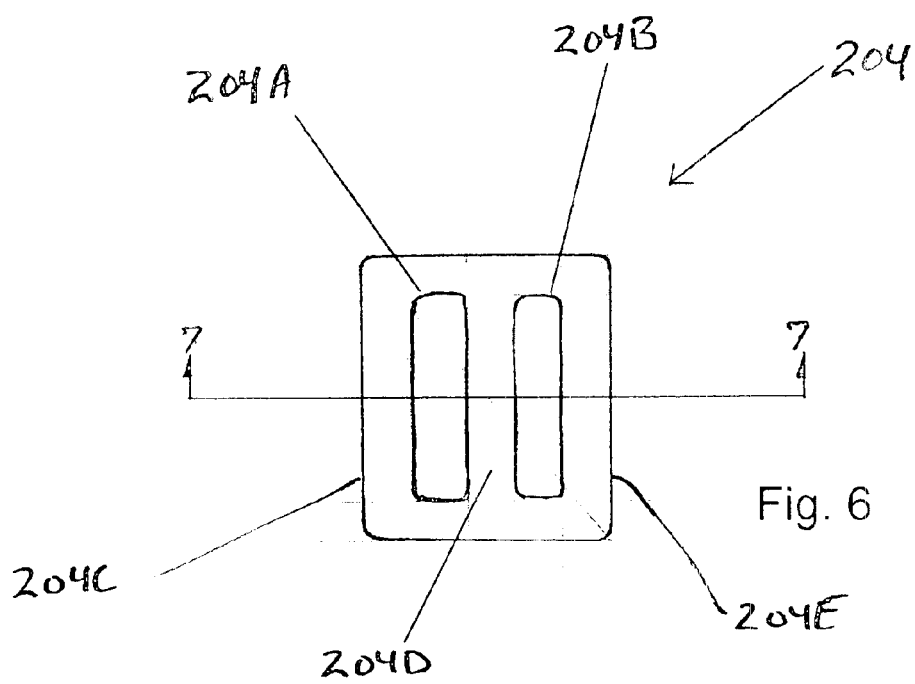
FIG. 6 is a top view of a length adjustor consistent with the present invention.

The length adjustor 204, as shown in FIG. 6 may have a plurality of web portions 204C, 204D, and 204E separated by a first opening 204A and a second opening 204B. The openings are sized to allow the tether 202 to be inserted there through. The length adjustor 204 may be moved along the tether 202 to change the overall length of the system from the clasp 206 to the buckle 208. The middle web portion 204D may be moveable relative to web portions 204C and 204E.

Figure 7A:
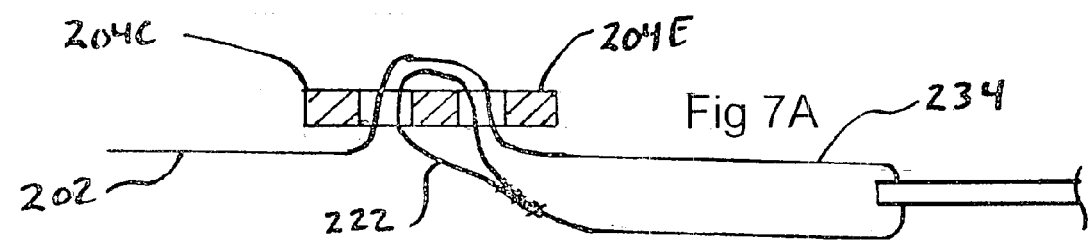
FIG. 7A is a section view of a first method consistent with the present invention for coupling the length adjustor of FIG. 6 to a length of tether.
Figure 7B:
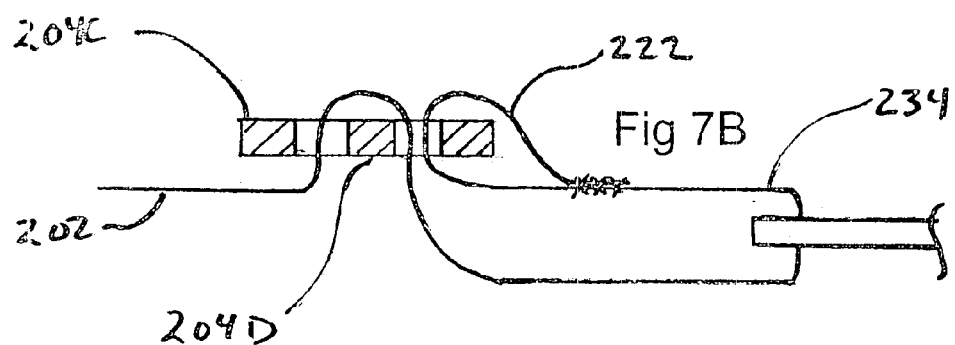
FIG. 7B is a section view of a second method consistent with the present invention for coupling the length adjustor of FIG. 6 to a length of tether.

A loop 222 formed about the second end of the tether 202 may be coupled to one or more of the web portions. FIG. 7A shows the loop 222 coupled to the center web portion 204D and FIG. 7B shows the loop 222 coupled to one of the outside web portions 204C/204E. The loop 222 may be formed by inserting the tether 202 through one of the openings 204A/204B in the length adjustor and then folding the tether back upon itself and either stitching the two pieces of tether material together or coupling them together using a mechanical fastener or adhesive. Alternatively, the tether may be mechanical or adhesively coupled to the length adjustor without a loop.

A loop 234 may be formed between the length adjustor 204 and the loop 222. The loop 234 may provide a convenient grasping location, spaced from the clasp 206, to allow a user to walk his pet.

The buckle 208 is preferably sized to fit in a variety of seat belt keepers. The buckle has an opening 228 through which the tether 202 may be inserted. The buckle 208 may be carried by the loop 234.

Figure 3:
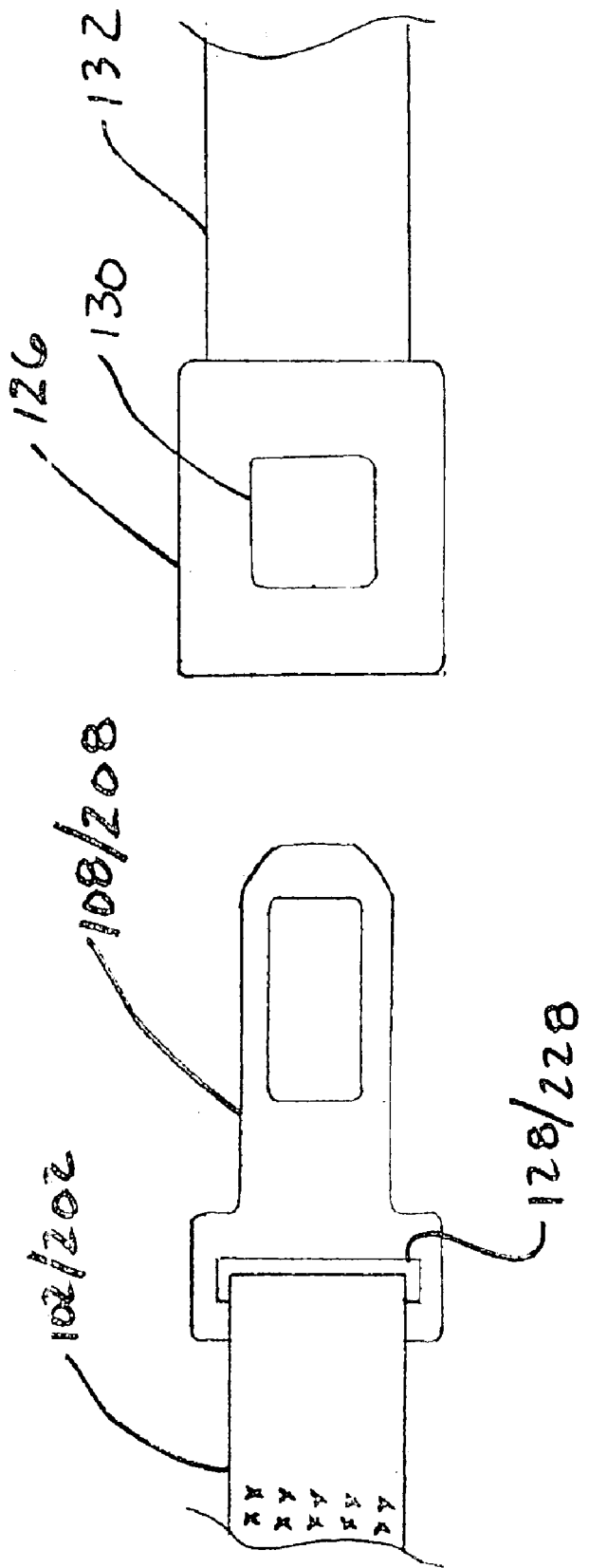
FIG. 3 is a top view of a first buckle and a keeper consistent with the present invention.

As best shown in FIG. 3, the buckle portion 108/208 is coupleable to the seat belt keeper 126 of an automobile or other vehicle The keeper 126 is in turn coupled to the vehicle through a tether 132. A release mechanism 130 may be provided for releasing the buckle portion 108/208 from the seat belt keeper 126.

Figure 4B:
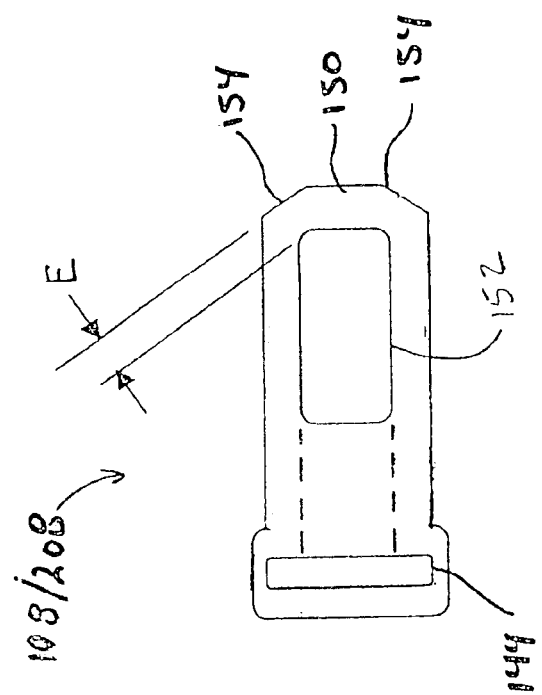
FIGS. 4A and 4B are top views of the buckle of FIG. 3.
Figure 4A:
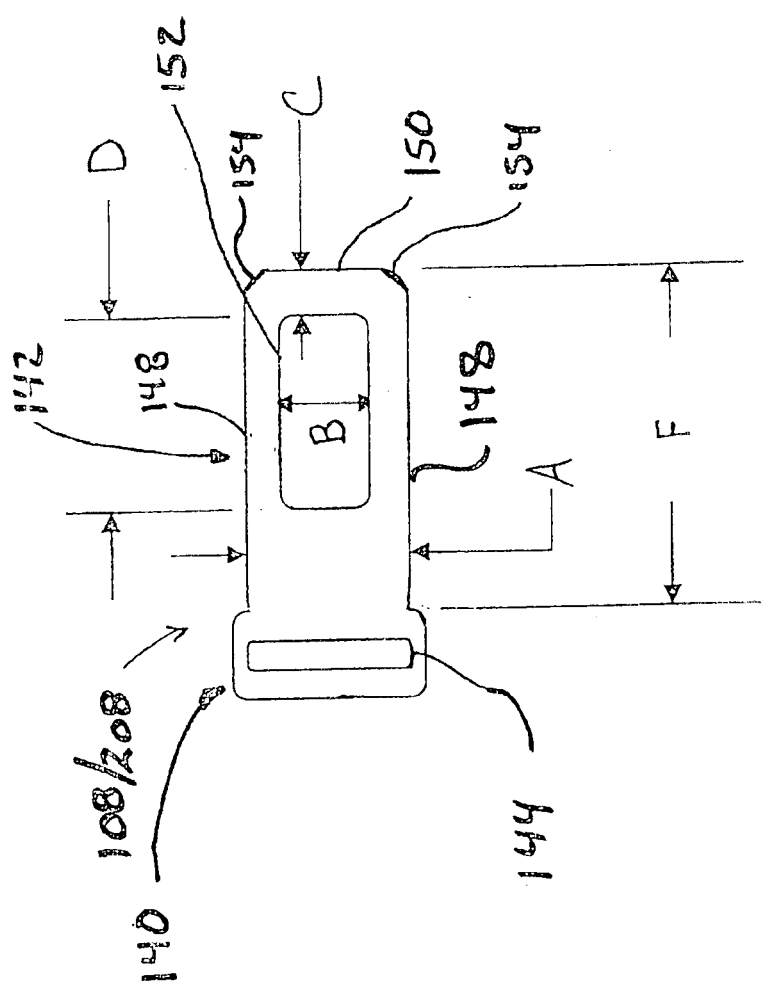

As shown in FIGS. 4A and 4B the buckle 108/208 may include a tether retaining section 140 and a tongue section 142. Both of these sections preferably formed of a generally planar material having a uniform thickness. The tongue section preferably having a maximum thickness of about 0.13", and more preferably a maximum thickness of about 0.09". The planar material is preferably metallic material, preferably steel or aluminum, or other suitably sturdy material that may be selected depending upon the weight of the object being restrained. The tether restraining section 140 may be wider (as shown in FIG. 4A), narrower, or the same width as the tongue section 142. The tether retaining section 140 may have an opening 144 through which the tether 102 may be inserted. The tongue section 142 may have a slot 152 formed therein. Disposed along side the slot may be a pair of preferably parallel legs 148. A front wall 150 may be coupled to the parallel legs 148. The front wall 150 may optionally include lead in sections 154. The dimensional and structural modifications are preferably selected to universally fit a variety of different vehicle makes and models. The slot 152 may extend into the opening 144.

The preferred dimensions of the buckle 108/208 will now be described in greater detail. First, referring to FIG. 4A, the tongue section preferably having an overall width "A" selected to be less than about 0.8", an overall length "F" selected to be less than about 1.65" and a material thickness selected to be less than about 0.13", more preferably less than about 09". The slot preferably having a width "B" selected to be greater than about 0.53" and length "D" selected to be greater than about 0.99". The front wall preferably having a width "C" selected to be less than about 0.23". The front wall preferably having a lead in section width "E" selected to be less than approximately 0.17".

These dimensions have been selected to allow a latch mechanism in the keepers 126 of a plurality of manufacturers' vehicles to latch within the slot 152. Although the keepers 126 are not shown here in detail, it should be understood that they comprise a slot into which the tongue section 142 fits and a latch mechanism inside the keeper for engaging the slot 152. Also, the outer dimensions of the tongue 142 as described above are selected to fit within the plurality of vehicles make and models keeper retention slot. The angled lead in portions 154 are also angled and dimensionally selected to fit within several manufacturers' vehicles' keepers. It should also be understood while the improved buckle 108/208 are profiled to fit within a plurality of manufacturers' vehicle restraint system keepers, it may lock and secure to several of these keepers while having a certain degree of play due to the dimensional tolerance of the slot 152 and its ability to fit both narrow and wide keeper latching mechanisms.

It should be understood by those reasonably skilled in the art that this buckle 108/208 may be utilized in connection with any device which is to be used as a universal vehicle accessory sold either together with or separately from the vehicle and adapted to fit multiple vehicle manufacturers' makes and models.

Figure 5:
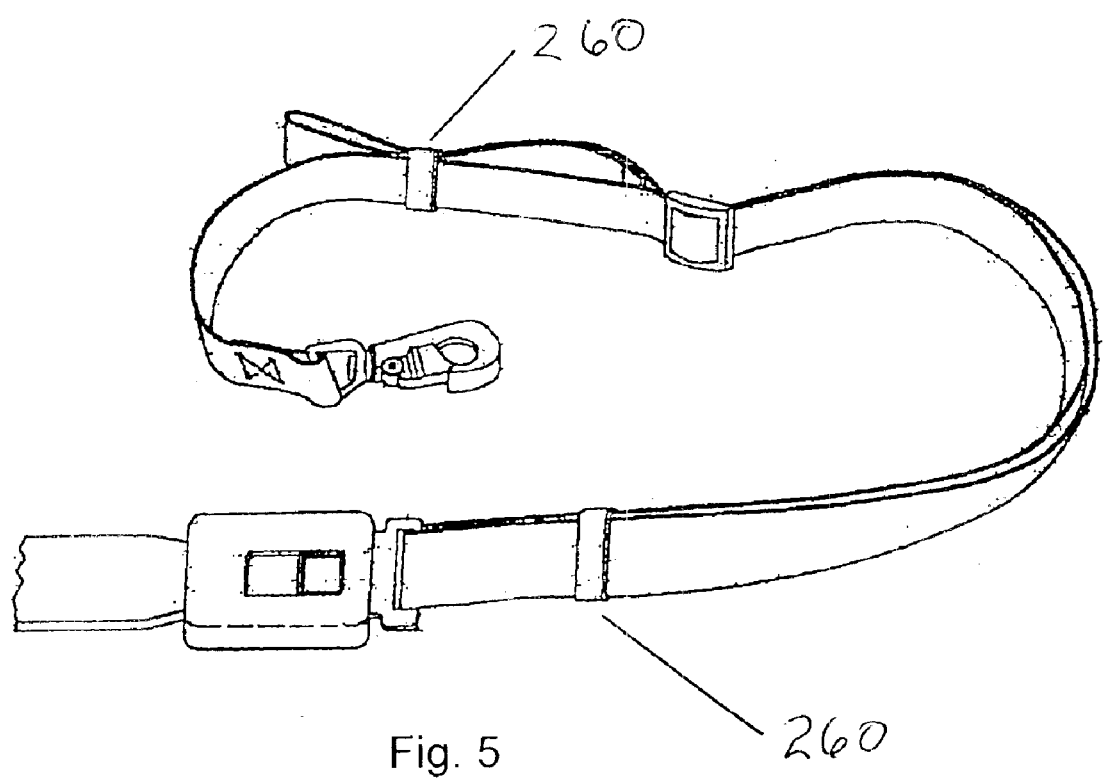
FIG. 5 is a perspective view of a third exemplary animal restraint system consistent with the present invention.

FIG. 5 shows an alternative embodiment pet restraint system having organizers 260.

In use, the animal restraint 100 may be adjusted to a desired length utilizing the length adjustor 104/204 as described with reference to FIGS. 1 and 2. The length is adjusted to allow the animal adequate freedom of movement while preventing the animal's exit from any opening of the vehicle. The tether 102/202 is secured to a collar or harness on the animal by connecting the clasp 106/206 to a ring or other securing device on a harness or collar. The buckle portion 108/208 may then be coupled to the seat belt keeper 126 of an automobile in conventional fashion. It should be understood that the buckle 108/208 may be coupled to the seat belt keeper 126 before or after securing the clasp 106/206 to a collar or harness on the animal. If the buckle 108/208 does not securely couple to the keeper 126 in a particular vehicle, the user can simply thread the existing vehicle seat belt buckle through the loop 134/234 and then couple the vehicle seat belt buckle to the keeper 126.

Figure 8:
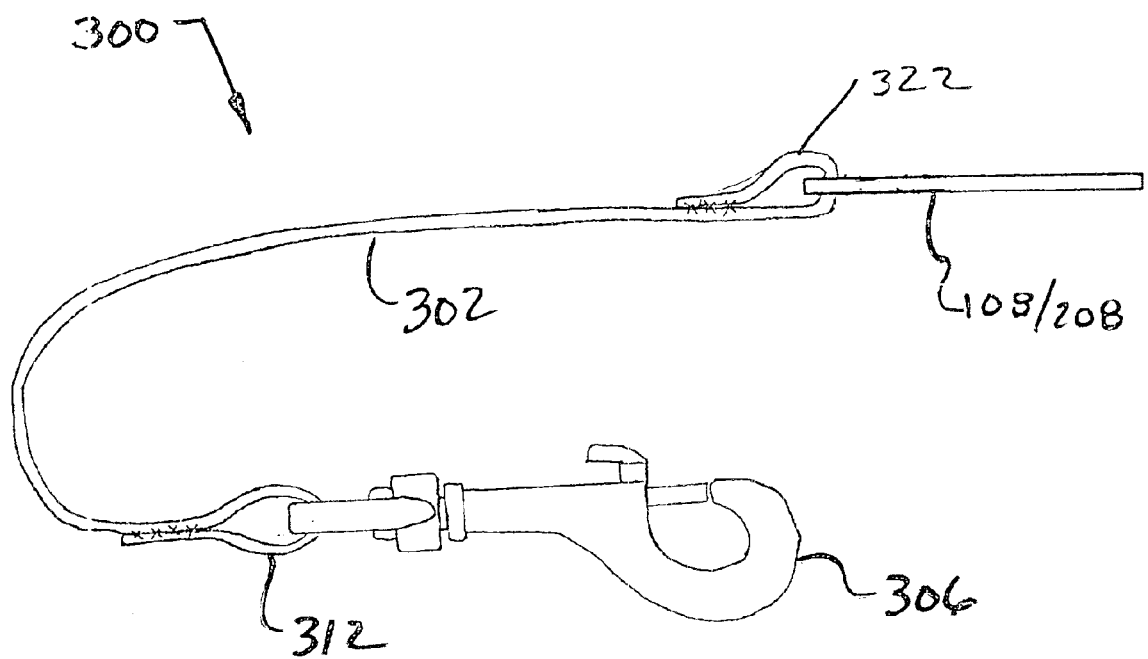
FIG. 8 is a side view of a fourth exemplary animal restraint system consistent with the present invention.

FIG. 8 shows an alternative embodiment pet restraint system 300 having a length of tether 302, a clasp 306, a buckle 108/208. The clasp 306 may be coupled to a first end of the tether 302 by a loop 312. Alternatively, the tether may be mechanical or adhesively coupled to the clasp 106 without a loop. The buckle 108/208 is preferably sized to fit in a variety of seat belt keepers 126. The buckle 108/208 may be coupled to a second end of the tether 302 by a loop 322. In this version, the overall length of the pet restraint system is nonadjustable.

Figure 9:
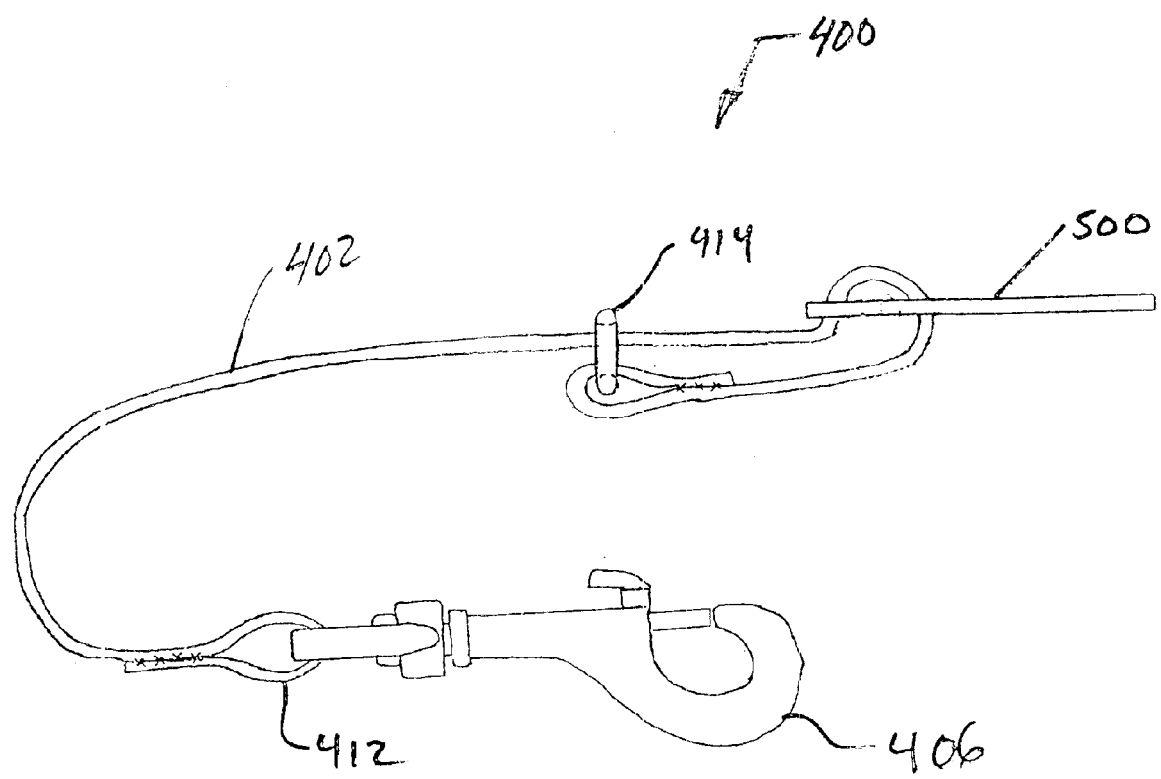
FIG. 9 is a perspective view of a fifth exemplary animal restraint system consistent with the present invention.

FIG. 9 shows an alternative embodiment pet restraint system 400 having a length of tether 402, a clasp 406, a length adjustor buckle 500, and an organizer 414. The clasp 406 may be coupled to a first end of the tether 402 by a loop 412. Alternatively, the tether may be mechanical or adhesively coupled to the clasp 106 without a loop. The length adjustor buckle 500 (see FIG. 10) is preferably sized to fit in a variety of seat belt keepers 126. A second end of the tether 402 may be treaded through a first opening 506 and a second opening 508 in the tether restraint section 502 of the length adjustor buckle 500. The organizer 414 may be a ring, preferably "D" shaped. The organizer 414 may be coupled to the second end of the tether 402. In this version, the length of the pet restraint system from the clasp 406 to the length adjustor buckle 500 is adjustable. FIG. 11 shows an alternative embodiment pet restraint system without an organizer.

Figures 10, 10A:
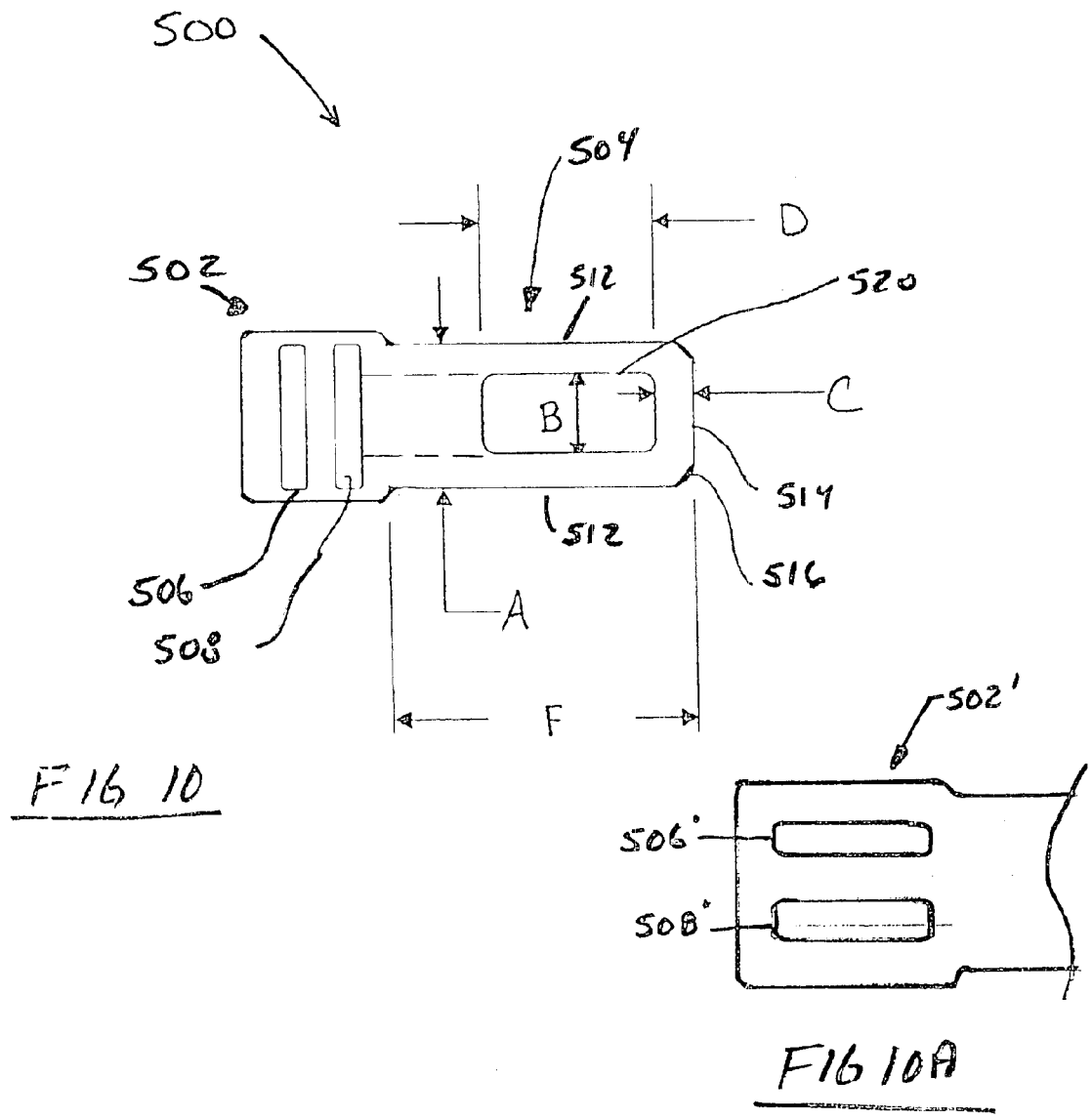
FIG. 10 is a side view of a second buckle consistent with the present invention.
FIG. 10A is a partial side view of a third buckle consistent with the present invention.

FIG. 10 shows a length adjustor buckle 500 having a tether retaining section 502 and a tongue section 504. Both of these sections may be formed of a generally planar material having a uniform thickness. The tongue section preferably having a maximum thickness of about 0.13 and more preferably a maximum thickness less than about 09". The planar material is preferably metallic material, preferably steel or aluminum, or other suitably sturdy material that may be selected depending upon the weight of the object being restrained. The tether restraining section 502 may be wider (as shown in FIG. 10), narrower, or the same width as the tongue section 504. The tether retaining section 502 may have a first opening 506 and a second opening 508 through which a tether may be inserted (see FIGS. 9, 11, and 12). The openings 506 and 508 may be elongated slots The longitudinal axis of the slots may be generally perpendicular to the longitudinal axis of the buckle as shown in FIG. 10 or the longitudinal axis of the slots may be generally parallel to the longitudinal axis of the buckle as shown in FIG. 10A. In an alternative embodiment, the longitudinal axis of the slots may be at any angle relative to the longitudinal axis of the buckle. The tongue section 504 may have a slot 520 formed therein. Disposed along side the slot may be a pair of preferably parallel legs 512. A front wall 514 may be coupled to the parallel legs 512. The front wall 514 may optionally include lead in sections 516. The preferred dimensions of the tongue section of the buckle 500 may be similar to those disclosed in FIGS. 4A and 4B. The slot 520 may extend into the opening 508. In an alternative embodiment, additional openings may be provided.

Figure 12:
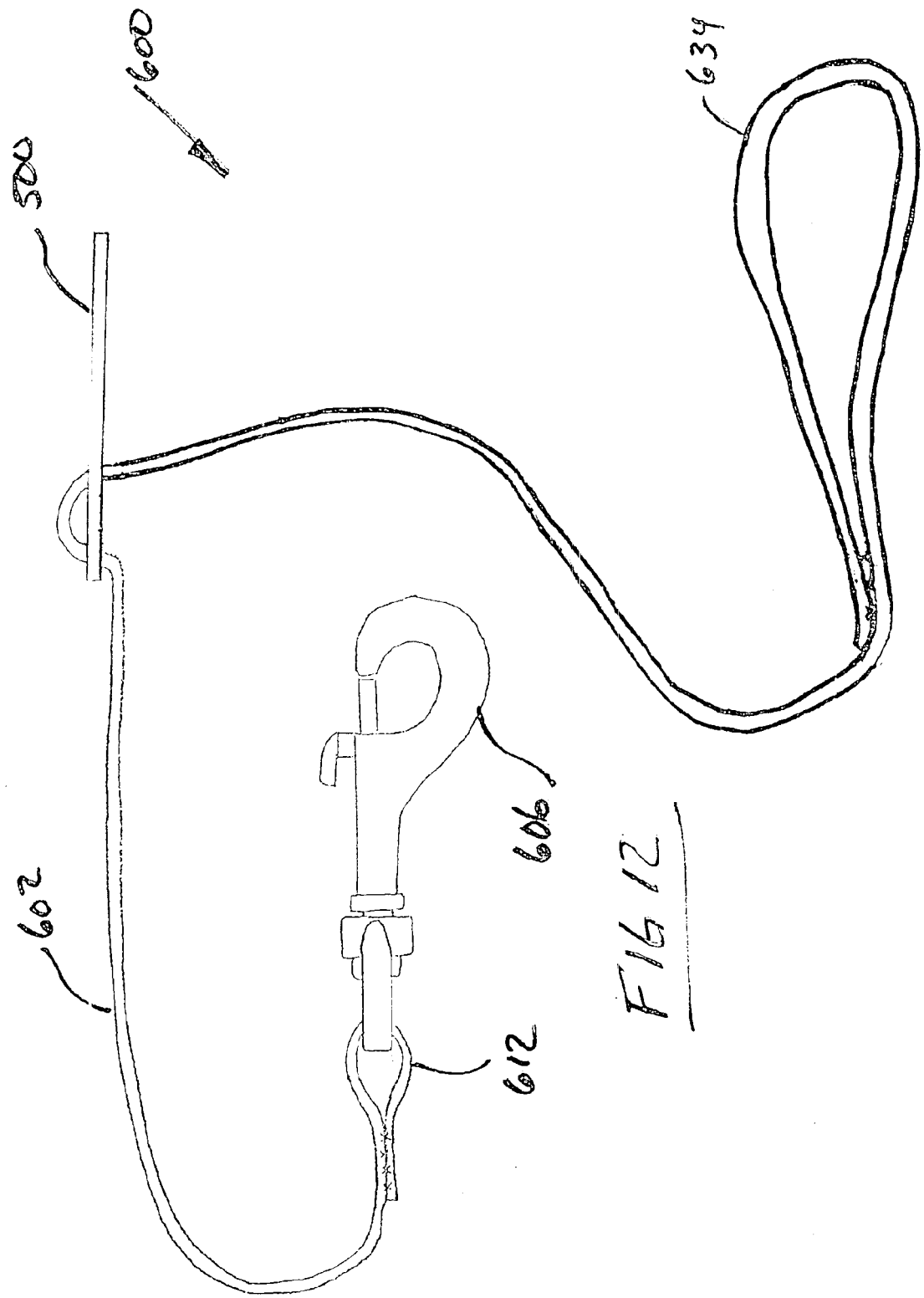
FIG. 12 is a perspective view of a seventh exemplary animal restraint system consistent with the present invention.

FIG. 12 shows an alternative embodiment pet restraint system 600 having a length of tether 602, a clasp 606, and a length adjustor buckle 500. The clasp 606 may be coupled to a first end of the tether 602 by a loop 612. Alternatively, the tether may be mechanical or adhesively coupled to the clasp 606 without a loop. The length adjustor buckle 500 is preferably sized to fit in a variety of seat belt keepers 126. A loop 634 may be formed at the second end of the tether 602. The loop 634 is preferably sized to allow the user's hand to extend therein. The tether 602 may be treaded through the first opening 506 and the second opening 508 in the tether restraint section 502 of the length adjustor buckle 500. In this embodiment, the distance from the clasp 606 to the length adjustor buckle 500 is adjustable. The first and second openings 506 and 508 respectively in the length adjustor buckle 500 may be sized to allow the loop portion 634 or clasp 606 to be threaded there through. The length adjustor buckle 500 may be sold separately and may be added to an existing pet leash. In this embodiment, the user can walk a pet by connecting the pet to the pet restraining system 600 using the clasp 606 and holding the loop portion 634. When the user gets to the vehicle for transporting the pet, the user simply inserts the length adjustor buckle 500 in the keeper 126.

Figure 13:
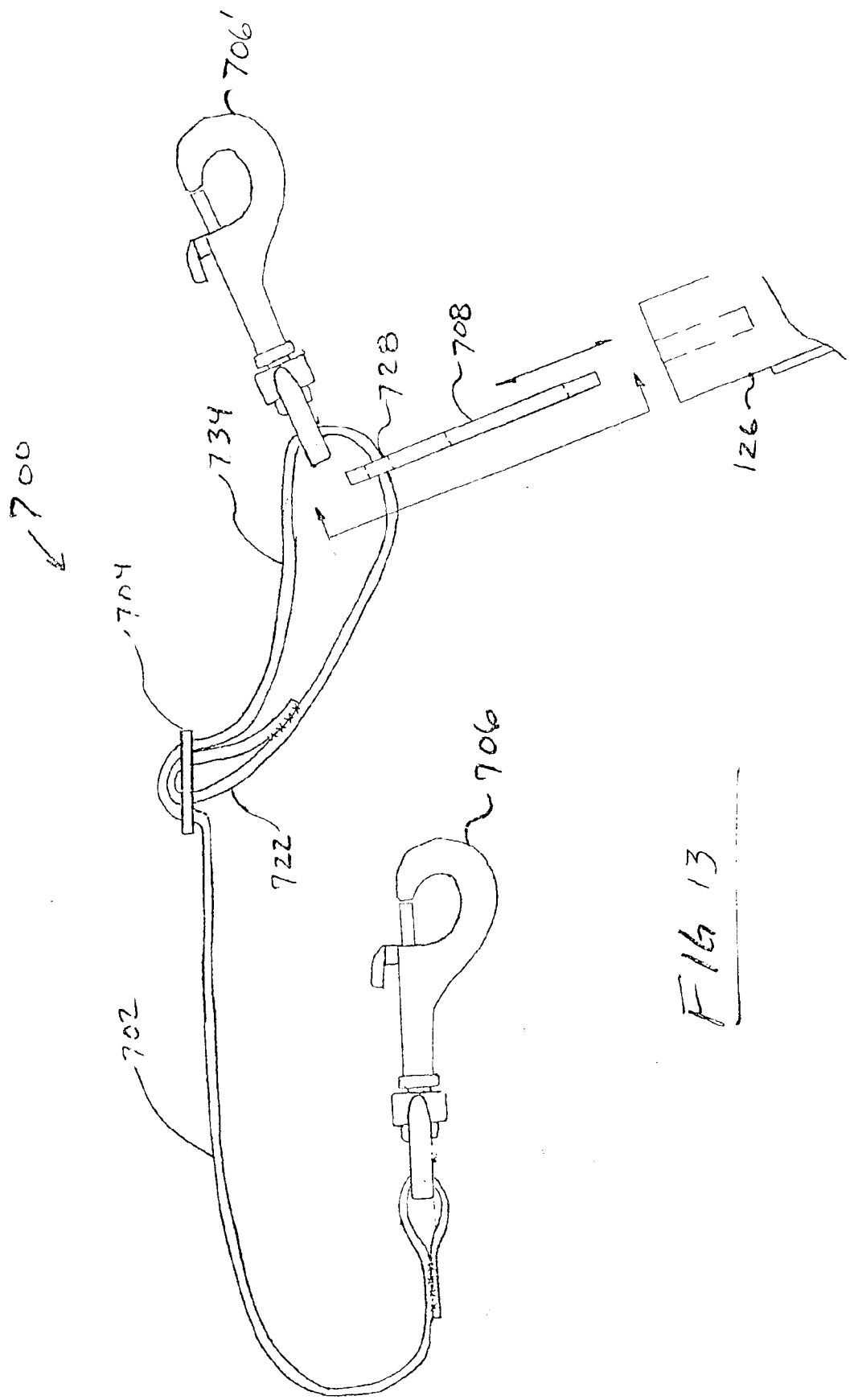
FIG. 13 is a perspective view of an eighth exemplary animal restraint system consistent with the present invention.

FIG. 13 shows an animal restraint system 700 having a length of tether 702, a length adjustor 704, a first clasp 706, a buckle 208, and a second clasp 706'. The first and second clasp may be the same or different. The tether 702, the length adjustor 704, the claps 706 and 706' and the buckle 708 may be identical to those described in FIG. 2.

A loop 734 may be formed between the length adjustor 704 and a loop 722. The loop 734 may provide a convenient grasping location, spaced from the clasp 706, to allow a user to walk his pet. The loop 734 may carry just a buckle 708, just a clasp 706', or both a buckle 708 and a clasp 706'. The clasp 706' may be used to secure the pet to a feature in the vehicle, such as a car seat bar.

It should further be understood that, while the present invention has been described in detail herein, the invention can be embodied otherwise without departing from the principles thereof, and such other embodiments are meant to come within the scope of the present invention as defined in the following claims.

I claim:

1. An animal restraint system for securing an animal in a vehicle comprising:
   a length of tether having a first end and a second end;
   a clasp for connecting to a pet collar or harness, the clasp being coupled about the first end;
   a first connector being coupled about the second end;
   a length adjustor having an opening through which a portion of the tether is inserted and a second connector, the second connector releasably coupleable to the first connector; and
   a buckle for coupling to an automotive seat belt keeper, the buckle being carried by the tether and disposed between the length adjustor and the second end, wherein the buckle comprises a tether restraint section through which the tether is inserted, and wherein the buckle further comprises a tongue section extending from the tether restraint section, the tongue section having a slot formed therein, the tongue section having a thickness of less than approximately 0.13", an overall width of less than approximately 0.8", and a front wall portion having a width of less than approximately 0.23", the slot having an overall width of greater than approximately 0.53" and a length of greater than approximately 0.99".

2. The animal restraint system of claim 1, wherein the tether comprises a first loop formed at the first end and a second loop formed at the second end.

3. The animal restraint system of claim 2, wherein the clasp comprises an opening through which the tether is inserted.

4. The animal restraint system of claim 2, wherein the clasp comprises a slide mechanism moveable between an open position and a closed position.

5. The animal restraint system of claim 2, wherein the clasp comprises a carabiner clip.

6. The animal restraint system of claim 1, wherein the front wall portion has a pair of lead in sections having a width of less than approximately 0.17".

7. The animal restraint system of claim 1, wherein one of the first and the second connector is a pinch clip.

8. The animal restraint system of claim 1, wherein a portion of the clasp is rotatable about the end of the tether.

9. The animal restraint system of claim 1, wherein tether is formed from a material selected from the group consisting of cotton, polyester, polypropylene, leather, flexible materials, and combinations thereof.

10. The animal restraint system of claim 1, wherein the buckle comprises a tether restraint section through which the tether is inserted.

11. The animal restraint system of claim 1, wherein the thickness of the tongue section is less than approximately 0.09".

12. An animal restraint system for securing an animal in a vehicle comprising:
   a length of tether having a first end and a second end;
   a clasp for connecting to a pet collar or harness, the clasp being coupled about the first end;
   a length adjustor having a first opening through which portion of the tether is inserted, the adjustor being coupled to the second end of the tether to form a loop; and
   a buckle for coupling to an automotive seat belt keeper, the buckle being coupled to the loop, wherein the buckle further comprises a tongue section extending from a tether restraint section of the buckle, the tongue section having a slot formed therein, the tongue section having a thickness of less than approximately 0.13", an overall width of less than approximately 0.8", and a front wall portion having a width of less than approximately 0.23', the slot having an overall width of greater than approximately 0.53" and a length of greater than approximately 0.99".

13. The animal restraint system of claim 12, wherein the length adjustor comprises a second opening spaced from the first opening by a web portion.

14. The animal restraint system of claim 13, wherein the second end is inserted through the second opening.

15. The animal restraint system of claim 12, wherein the second end is coupled to the web portion.

16. The animal restraint system of claim 15, wherein the tether extends through the first opening and the second opening.

17. The animal restraint system of claim 12, wherein movement of length adjustor along the tether adjusts the length of tether between the length adjustor and the buckle.

18. The animal restraint system of claim 12, wherein the loop is sized to allow a user's hand to extend there through.

19. An animal restraint system for securing an animal in a vehicle comprising:
   a length of tether having a first end;
   a clasp for connecting to a pet collar or harness, the clasp being coupled about the first end of the tether;
   a buckle having a tongue section for coupling to an automotive seat belt keeper; and
   a length adjustor having an opening through which a portion of the tether is inserted, the length adjustor forming a loop for restraining the buckle,
   wherein the tongue section has a slot formed therein, the tongue section having a thickness of less than approximately 0.13", an overall width of less than approximately 0.8", and a front wall portion having a width of less than approximately 0.23", the slot having an overall width of greater than approximately 0.53" and a length of greater than approximately 0.99".

20. The animal restraint system of claim 12, wherein the thickness of the tongue section is less than approximately 0.09".

21. A buckle being mateable with a plurality of vehicle restraint system keepers comprising:
   a tether restraint section;
   a tongue section extending from the tether restraint section, the tongue having a slot formed therein; the tongue having an overall width of less than approximately 0.8", a thickness of less than approximately 0.13", and a front wall portion having a width of less than approximately 0.23"; the slot having an overall width of greater than approximately 0.52" and a length of greater than approximately 0.99".

22. The buckle of claim 21, wherein the tongue section has an overall length of less than approximately 1.65".

23. The buckle of claim 21, wherein the front wall portion further comprises a pair of lead in sections.

24. The buckle of claim 21, wherein the thickness of the tongue section is less than approximately 0.09".

25. A buckle comprising:
   a tether retaining section having generally parallel first and second openings through which a tether may be inserted; and
   a tongue section coupled to the tether restraining section, the tongue section having a slot formed therein, the tongue section having a thickness of less than approximately 0.13", an overall width of less than approximately 0.8", and a front wall portion having a width of less than approximately 0.23", the slot having an overall width of greater than approximately 0.53" and a length of greater than approximately 0.99".

26. The buckle of claim 25, wherein a longitudinal axis of the openings are generally parallel to a longitudinal axis of the buckle.

27. The buckle of claim 25, wherein a longitudinal axis of the openings are generally perpendicular to a longitudinal axis of the buckle.

28. An animal restraint system for securing an animal in a vehicle comprising:
   a length of tether having a first end;
   a clasp for connecting to a pet collar or harness, the clasp being coupled about the first end of the tether; and
   a buckle having a tongue section for coupling to an automotive seat belt keeper and a tether restraint section, the tether restraint section having generally parallel first and second closed-sided openings through which a tether may be inserted and removably retained therewithin, and resist accidental dislodgement as a function of the first and second closed-sided openings,
   wherein the tongue section has a slot formed therein, the tongue section having a thickness of less than approximately 0.13", an overall width of less than approximately 0.8", and a front wall portion having a width of less than approximately 0.23", the slot having an overall width of greater than approximately 0.53" and a length of greater than approximately 0.99".

29. The animal restraint system of claim 28, wherein the openings are elongated slots.

30. The animal restraint system of claim 29, wherein a longitudinal axis of the slots are generally perpendicular to a longitudinal axis of the buckle.

31. The animal restraint system of claim 28, wherein a loop is formed about the second end of the tether.

32. The animal restraint system of claim 31, wherein the buckle is disposed between the clasp and the loop.

33. The animal restraint system of claim 31, wherein the loop is sized to allow a user's hand to extend therein.

34. The animal restraint system of claim 32, wherein the loop is coupled to the tether by an organizer.

35. A method of converting a pet leash with a clasp at a first end and a loop at a second end into a pet restraint system comprising:

providing a buckle having a tether restraint section with generally parallel first and second closed-sided openings and a tongue section coupled to the tether restraining section; and threading a selected one of the first end and the second end of the pet leash serially through the first and second closed-sided openings for removably retaining the selected end of the pet leash therewithin, and for resisting accidental dislodgement of the selected end of the pet leash therefrom as a function of the first and second closed-sided openings, wherein the tongue section has a slot formed therein, the tongue section having a thickness of less than approximately 0.13", an overall width of less than approximately 0.8", and a front wall portion having a width of less than approximately 0.23", the slot having an overall width of greater than approximately 0.53" and a length of greater than approximately 0.99".

36. The buckle of claim 25, wherein the thickness of the tongue section is less than approximately 0.09".

* * * * *